April 14, 1964
J. S. DONALDSON
3,128,519
PARACHUTE DISCONNECT DEVICE
Filed Feb. 20, 1962
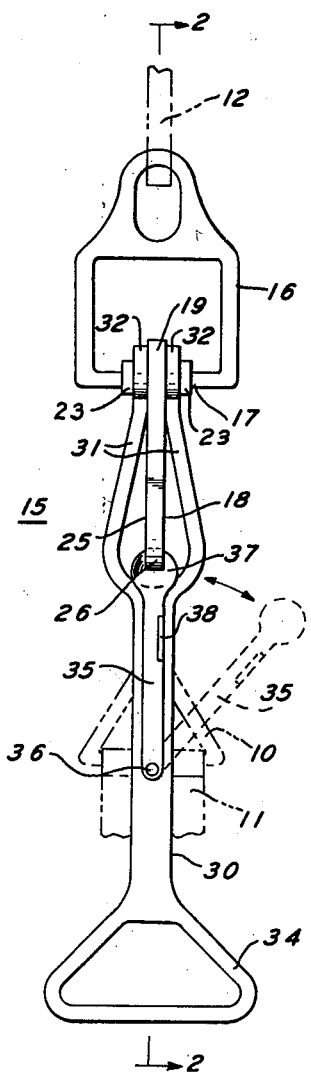
FIG.1
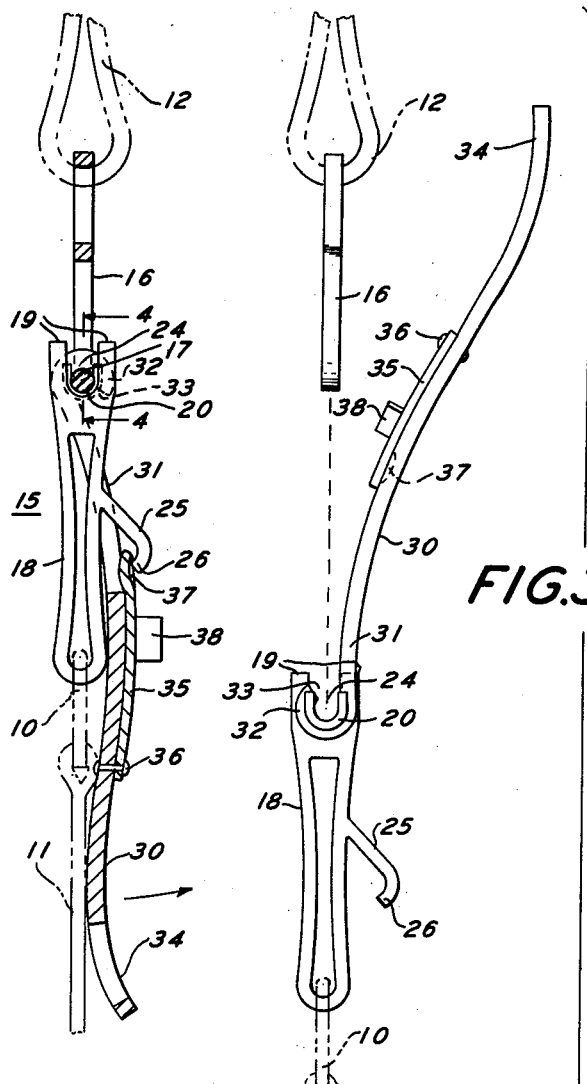
FIG.2
FIG.3
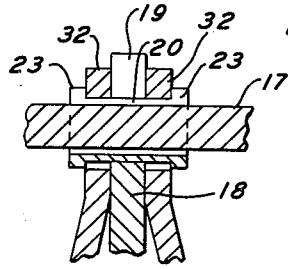
FIG.4
INVENTOR.
J. S. DONALDSON
BY
ATTORNEY

3,128,519
PARACHUTE DISCONNECT DEVICE
John Shearman Donaldson, Chatham, N.J. (% Penna. Engr. Co., 1107–21 N. Howard St., Philadelphia 23, Pa.)
Filed Feb. 20, 1962, Ser. No. 174,576
1 Claim. (Cl. 24—230)

This invention relates to disconnect devices and more particularly to devices for use with parachutes for effecting a safe quick release of the body harness from the parachute straps.

Various release devices for quickly disconnecting the body harness from the parachute straps have heretofore been proposed but none of these has proven wholly satisfactory. With certain of the devices now in use the force required to effect the release is difficult to apply, no easy control by the operator can be effected and the movement for release is confusing and cumbersome. In other devices now available both hands are required for the operation of each release or disconnect device so that the user after release of one side may dangle on the other side with release of the second side very difficult.

It is the principal object of the present invention to provide a safe disconnect device which is simple in construction, which may be easily operated with either hand even if encased in a heavy glove, and which has a high degree of stability.

It is a further object of the present invention to provide a disconnect device which is at all times under the safe control of the user, and which may be preliminarily conditioned for quick but controlled release.

It is a further object of the present invention to provide a parachute disconnect device which has a simple but effective double lock to prevent accidental release.

It is a further object of the present invention to provide a parachute disconnect device in which the forces applied in tension aid in retaining the device in stable and safe latched condition but without interference with the releasing action.

It is a further object of the present invention to provide a parachute disconnect device which may be used in pairs, one at each side, and with which both devices of the pair can be simultaneously released by the user.

Other objects and advantageous features of the invention will be apparent from the description and claims.

The nature and characteristic features of the invention will be more readily understood from the following description taken in connection with the accompanying drawings forming part thereof, in which:

FIGURE 1 is a front elevational view of a parachute disconnect device in accordance with the invention;

FIG. 2 is a vertical sectional view of the device shown in FIG. 1, taken approximately on the line 2—2 of FIG. 1;

FIG. 3 is a side elevational view of the device shown in FIGS. 1 and 2 immediately after release; and FIG. 4 is an enlarged fragmentary sectional view taken approximately on the line 4—4 of FIG. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, an attaching strap 10 and link 11 are shown one of which is connected to each side of the body harness. A parachute connecting link 12 is shown, one of the disconnect devices 15 to be described being interposed between the link 11 and the link 12 on each side.

The link 12 has pivotally mounted thereon an open eye 16 having a horizontal bar portion 17.

A supporting body 18 is provided with which the link 11 engages. The body 18 has, at the upper end, a bifurcated section 19 for the reception of the bar portion 17 and has a sleeve 20 secured thereto. The sleeve 20 has enlarged ends 23 and an upwardly disposed slot 24.

The body 18, at the front thereof, has an inclined holding finger 25 with an inturned lower end 26.

A control lever 30 is provided having a pair of spaced arms 31 with upper spaced hooked portions 32. The hooked portions 32 are rotatable on the sleeve 20, between the ends 23 which retain the hooked portions 32 against sidewise displacement. The hooked portions 32 have openings 33. The hooked portions 32 are normally positioned for retaining the bar portion 17 and the lever 30 in engagement, but permit separation of the bar portion in an upright position of the lever 30. The lever 30 at the end opposite from the hooked portions 32 has an enlarged end 34 for ease of manual manipulation.

The control lever 30, intermediate its ends, has a locking lever 35 pivotally mounted thereon by a pivot pin 36. The lever 35 is movable sidewise of the control lever 30 and has a dish shaped end 37 for resilient engagement with the end 26 of the holding finger 25. The lever 35 can have a projection 38 for facilitating swinging movement thereof to or from a locked position.

The mode of use will now be pointed out.

For initial connection, the strap 10 is connected to the body harness on one side and the link 12 is connected to the parachute lines on the same side. The body harness and parachute lines are similarly connected on the other side. With the control lever 30 swung upwarly to the position shown in FIG. 3, the bar 17 is inserted into the sleeve 20 through the slot 24. The lever 30 is then swung downwardly about the pivotal bearing of the hooked portions 32 on the sleeve 20. Downward movement of the lever 30 moves the openings 33 out of alignment with the slot 24 so that separation of the bar 19 cannot be effected.

When the lever 30 is at its lowermost position the locking lever 35 is swung to position the dished end 37 into engagement with the end 26 of the holding finger 25. The control lever 30 is then in a locked position.

In use the parachute lines and body harness are connected by the disconnect devices 15 on each side. With the body of the user supported by the body harness, the weight of the user is supported on each side by the disconnect devices 15 with bars 19 and the hooked portions 32 in pivotal engagement. The positioning of the locking levers 35 prevents accidental movement of the control levers 30.

If the user, either in suspended condition or otherwise, desires to disconnect the device 15 and assuming that it is to be effected on both sides, the user first moves the locking levers 35 to their unlocking positions. This action does not in and of itself cause or require any movement of the lever 30 but merely conditions the lever 30 for the releasing movement. The weight of the user does not have any releasing action but by reason of the friction between the hooked portions 32 and the bar 19 under tension enhances the stability.

Upward movement of the lever 30 can then be easily effected by the user and the speed and extent of movement of the lever 30 to bring the openings 33 at the ends of the hooked portions 32 to their upper and releasing positions. The user can position the levers 30 horizontally in preparation for release and wait as long as desired before completing the releasing action.

The disconnecting action is under the control of the user and with freedom from complication either of structure or operation.

I claim:

A parachute disconnect device for interposition between body harness and parachute lines comprising a first body member for connection to the parachute lines and having a horizontal bar, a second body member for connection to the body harness and having a bifurcated portion at the upper end thereof, said bifurcated portion having a bar receiving sleeve horizontally disposed therein for pivotal mounting of the bar therein and extending therefrom to opposite sides thereof, said sleeve having enlarged ends and an upwardly extending opening for the reception of said bar, a manually operable control lever having spaced hooked portions pivotally engaged on said sleeve between said bifurcated portion and said ends, said control lever being movable from a downwardly disposed holding position to an upwardly disposed release position, said hooked portions having openings facing along said control lever for alignment with said upwardly extending openings in said upwardly disposed position of said lever for insertion and separation of said bar and for downward disposition for preventing removal of said bar from said sleeve, and interengaging members on said control lever and said second body member for releasably locking said control lever in said downwardly disposed holding position, said interengaging members including a locking lever pivotally mounted on said control lever for lateral movement with respect thereto, said locking lever having a dished end portion, and said second body member having a portion for engagement by said dished portion.

References Cited in the file of this patent

UNITED STATES PATENTS

| | | |
|---|---|---|
| 631,697 | Charest | Aug. 22, 1899 |
| 1,269,074 | Gordon | June 11, 1918 |
| 1,394,618 | Griffin | Oct. 25, 1921 |
| 1,436,343 | Griffin | Nov. 21, 1922 |

FOREIGN PATENTS

| | | |
|---|---|---|
| 727,600 | Germany | Nov. 6, 1942 |
| 463,173 | Italy | Apr. 18, 1951 |